(12) United States Patent
Rucker et al.

(10) Patent No.: US 11,301,888 B2
(45) Date of Patent: *Apr. 12, 2022

(54) PROVIDING QUANTITATIVE EVALUATIONS OF FRICTION WITHIN A CUSTOMER EXPERIENCE TO REDUCE ABANDONMENT AND IMPROVE CONVERSION OF TRANSACTIONS

(71) Applicant: NTT Data, Inc., Plano, TX (US)

(72) Inventors: Brad Rucker, Plano, TX (US); Matthew W. Leach, Plano, TX (US)

(73) Assignee: NTT Data, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/883,712

(22) Filed: May 26, 2020

(65) Prior Publication Data

US 2020/0387918 A1 Dec. 10, 2020

Related U.S. Application Data

(63) Continuation of application No. 15/663,016, filed on Jul. 28, 2017, now Pat. No. 10,699,287.

(51) Int. Cl.
G06Q 30/02 (2012.01)
(52) U.S. Cl.
CPC ..... G06Q 30/0205 (2013.01); G06Q 30/0201 (2013.01); G06Q 30/0281 (2013.01)
(58) Field of Classification Search
CPC .................................................. G06Q 30/02
USPC ...................................................... 705/7.34
See application file for complete search history.

(56) References Cited

U.S. PATENT DOCUMENTS

| 9,231,979 | B2 * | 1/2016 | Duke | H04L 63/20 |
| 9,594,907 | B2 * | 3/2017 | Duke | G06F 21/566 |
| 2007/0192167 | A1 * | 8/2007 | Lei | G06Q 20/227 |
| | | | | 705/7.31 |

(Continued)

FOREIGN PATENT DOCUMENTS

WO  WO 2018/200265 A1 * 11/2018 ............. G06Q 20/00

OTHER PUBLICATIONS

Thompson, John R.J.; Feng, Longlong; Reesor, R. Mark; Grace, Chuck, Know Your Client's behaviours: a cluster analysis of financial transactions (English), May 7, 2020 (Year: 2020).*

*Primary Examiner* — Marilyn G Macasiano
(74) *Attorney, Agent, or Firm* — Pillsbury Winthrop Shaw Pittman, LLP

(57) ABSTRACT

Quantitative evaluations of friction within a customer experience may be provided to reduce abandonment and improve conversion of transactions. One or more transactions may be identified. One or more personas corresponding to the one or more transactions may be identified. One or more customer friction factor (CFF) scores corresponding to the one or more transactions may be determined. A given CFF score may be a quantification of an aspect of a given transaction that has a negative impact on a customer experience associated with the given transaction. The one or more CFF scores may be compared with one or more valid comparisons relating to the same industry and the same transaction type. One or more friction points may be identified based on the comparison of the one or more CFF scores. Addressing a friction point may reduce abandonment and improves conversion associated with transactions.

28 Claims, 9 Drawing Sheets

(56) References Cited

U.S. PATENT DOCUMENTS

2007/0288641 A1\* 12/2007 Lee .................. G06Q 30/06
709/227
2018/0130068 A1\* 5/2018 Sampath ............. H04M 3/4217

\* cited by examiner

| Generation: | Greatest Generation | Silent Generation | Baby Boomer | Gen X | Millennial | Boomlets |
|---|---|---|---|---|---|---|
| Customer | •Tech Challenged<br>•Do without<br>•Immune to advertising<br>•In Person, On Phone, Online | •Tech Averse<br>•Save and pay cash<br>•Influenced by advertising<br>•On Phone, In Person, Online | •Tech Assisted<br>•Buy on credit – shopping as an activity<br>•Shaped by advertising<br>•Online, On Phone, In Person | •Tech Watershed<br>•Conservative, savers<br>•Advertising Imbedded<br>•Online, On Phone In Person | •Tech Savvy<br>•Financially dependent much longer<br>•Shaped by Social Media<br>•Online, In Person, On Phone | •Tech Dominant<br>•N/A to date<br>•Center of family activity<br>•Online, In Person, On Phone |
| Employee | | | •Meetings solve problems<br>•Hierarchy Org<br>•Command & Control<br>•Organized<br>•Get everyone involved<br>•Data is king<br>•Career = 3 companies | •Prepared, scheduled meetings<br>•Matrixed Org<br>•No drop-ins<br>•Organized<br>•Individualistic<br>•Process is king<br>•Career = 7 companies | •Short meetings<br>•Event-driven Org<br>•Constant Feedback<br>•(Seemingly) Chaotic & Impatient<br>•Team oriented<br>•Ideas are king<br>•Career = 15 companies | |
| Partner | | | •Face to face<br>•Confluence of responsibilities<br>•Group design, group testing, then present | •Conference Call<br>•Collaborate<br>•Design, verify, then share | •Text me<br>•Idea exchange<br>•Imagine it, don't overdevelop it | |

FIG. 2

| Generation: | Greatest Generation | Silent Generation | Baby Boomer | Gen X | Millennial | Boomlets |
|---|---|---|---|---|---|---|
| Preferred Channel | Come See Me In Person | Call Me | Email Me | I'm Online | Text Me | I'm Mobile |
| Disliked Channel | Don't make me go online | Don't make me go online | Don't make me come over there | Don't make me come over there | Don't call me. Ever. | Don't call me. Ever. |

FIG. 3

Lowest Possible Score is the Goal

| Engagement | Process | Technology | Ecosystem | Knowledge |
|---|---|---|---|---|
| ▲ 1 *Per* Typed letter / key\<br>▲ 50 *Per* Incorrect product or service received<br>▲ 25 *Per* Missed commitment (date/time) | ▼ -50 *Per* Business changed policy to perform requested service | ▲ 25 *Per* Dropped Connection / transaction<br>▲ 5 *Per* Window refresh / change<br>▲ 5 *Per* UI change in style<br>▲ 5 *Window* Non-intuitive interface<br>▲ 10 *System* More than one application needed | ▲ -2 *Per* Multiple channel options (PC / Smart phone / Human-answered phone number)<br>▼ -5 *N/A* Live help available on request | ▲ 25 *Per* Unclear Product / Service is available<br>▲ 10 *Field* Retyping info erased by error routine<br>▲ 5 *Field* Acronym not explained by mouseover |
| ▲ 100 *Per* Helping employee to fill out form while on the phone<br>▲ 1 *Minute* On Hold waiting for call to be picked up<br>▲ 25 *Per* On Hold while employee searches for info | ▲ 10 *Per* Having to leave a message or a voicemail | ▲ 30 *Per* Disconnected call on hold or while being transferred<br>▲ 25 *Per* Re-entering information within automated system | ▲ 10 *Per* Customer-initiated call<br>▲ 5 *Per* Business-initiated call<br>▼ -5 *Call* Friendliness and Courtesy shown by employee | ▲ 25 *Per* Repeating info that another employee at business had received before |
| ▲ 20 *Per* Taking a number<br>▲ 1 *Minute* Wait time before appointment<br>▲ 10 *Minute* Wait time after appointment time | ▲ 5 *Field* Repeated information on form that business has received before<br>▲ 50 *Per* Having to return at another time | ▲ 25 *per Instance* print out given to the customer<br>▲ 35 *Wait* time information not displayed or unclear | ▼ -5 *Visit* Being greeted by name | |
| | | | | ▲ 25 *Page* Filling out a paper form<br>▲ 5 *Page* Filling out an e-form |

Proximity / Presence: Online → On Phone → In Person

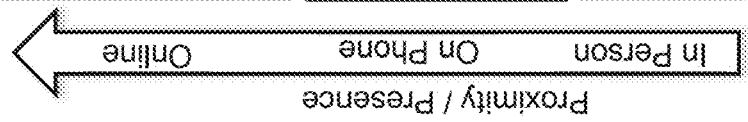

Points *Unit* Description

FIG. 4

| | Company A - CFF:152 | Company B - CFF: 435 |
|---|---|---|
| Engagement | • Strong social media integration<br>• Elicit feedback from friends<br>• Multi-channel contact center<br>• Inventory of products, interaction, consistent between online and in-store experience<br>• Single brand voice and style<br>• Regular communication on new styles and alerts on FSA deadlines<br>• Concierge and high-touch interaction | • Experience changes by location<br>• Some products only available in some stores<br>• All engagement is driven by the customer<br>• All communicate is reactive<br>• Traditional contact center |
| Process | • Can select, try-on, and purchase glasses from home<br>• Customer determines how to engage | • Easy to select glasses online<br>• In-store purchase only<br>• Limited availability in-stores |
| Technology | • Seamless transition between online and instore experience.<br>• Goals accomplished via either channel | • User driven transition between channels<br>• In-store focus<br>• Basic Facebook integration<br>• Challenging Map application |
| Ecosystem | • Warby Parker is vertically integrated<br>• Collaboration with designers and charities<br>• Flexible with optometrist . | • Collaborates with popular designers<br>• In-store optometrist |
| Knowledge | • Customer information is stored online as part of a single customer profile<br>• Multi-channel retrieval of information | • Customer information is stored online as part of a single customer profile |

FIG. 5

PROVIDING QUANTITATIVE EVALUATIONS OF FRICTION WITHIN A CUSTOMER EXPERIENCE TO REDUCE ABANDONMENT AND IMPROVE CONVERSION OF TRANSACTIONS

CROSS-REFERENCE TO RELATED APPLICATIONS

The present application is a continuation of U.S. patent application Ser. No. 15/663,016, titled PROVIDING QUANTITATIVE EVALUATIONS OF FRICTION WITHIN A CUSTOMER EXPERIENCE TO REDUCE ABANDONMENT AND IMPROVE CONVERSION OF TRANSACTIONS, filed 28 Jul. 2017. The entire content of each aforementioned application is hereby incorporated by reference.

FIELD OF THE DISCLOSURE

This disclosure relates to providing quantitative evaluations of friction within a customer experience to reduce abandonment and improve conversion of transactions.

BACKGROUND

With 55% of US online adults likely to abandon their online transaction if they cannot find a quick answer to their question or problem, as reported by Forrester Research, it is often critical to address friction points in online transactions in order to reduce abandonment and improve conversion. The tasks of identifying friction points associated with an online transaction and then determining which frictions points matter most generally fall on sophisticated customer relations management (CRM) systems. These systems analyze databases storing vast amounts of information relating to customer behavior in connection with one or more individual online transactions. Traditional measures of customer friction, however, are flawed. Customer surveys are often reactive, only showing results for the tails of the bell curve of customer experiences. Net promoter scores have limited scope (e.g., how, not why). Sentiment analysis is often subject to sampling bias and misses non-responses.

SUMMARY

One aspect of the disclosure relates to a method for providing quantitative evaluations of friction within a customer experience to reduce abandonment and improve conversion of transactions. Addressing the fact that around 44% of U.S. customers experience unsatisfactory online interactions per year, exemplary implementations provide improvements in existing computerized CRM technology that achieve benefits over conventional databases. Indeed, exemplary implementations may provide increased granularity, increased accuracy, an ability to handle more comprehensive datasets, reduction or elimination of bias, faster analysis times, and/or smaller memory requirements. This may result in a deeper understanding of friction from the perspective of customer goals, more accurate determinations of causes of customer friction, and improved ability to provide a proactive and comprehensive evaluation of the transaction. Ultimately, exemplary implementations may provide insight by assessing the customer's entire journey through the transaction and determine how to improve the experience to surpass customer expectations, contain internal costs, and deliver pain-free service.

The method may include identifying one or more transactions. The one or more transactions may include a first transaction. The method may include identifying one or more personas corresponding to the one or more transactions. The one or more personas may include a first persona corresponding to the first transaction. The method may include determining one or more CFF scores corresponding to the one or more transactions. The one or more CFF scores may include a first CFF score corresponding to the first transaction. The first CFF score may be a quantification of an aspect of the first transaction that has a negative impact on a customer experience associated with the first transaction. The method may include comparing the one or more CFF scores with one or more valid comparisons including a first comparison. The first comparison may relate to the same industry as the first transaction and the same transaction type of the first transaction. The first CFF score may be compared to the first comparison. The method may include identifying one or more friction points based on the comparison of the one or more CFF scores. The one or more friction points may include a first friction point. The first friction point may be associated with the first transaction. Addressing the first friction may reduce abandonment and improve conversion associated with transactions.

These and other features, benefits, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates exemplary generational characteristics or preferences.

FIG. 3 illustrates generational scoring, in accordance with one or more implementations.

FIG. 4 illustrates various exemplary customer friction factor scoring metrics, in accordance with one or more implementations.

FIG. 5 illustrates a comparison between exemplary customer friction factor scores associated with the experience of purchasing eyeglasses, in accordance with one or more implementations.

DETAILED DESCRIPTION

Figure 1:
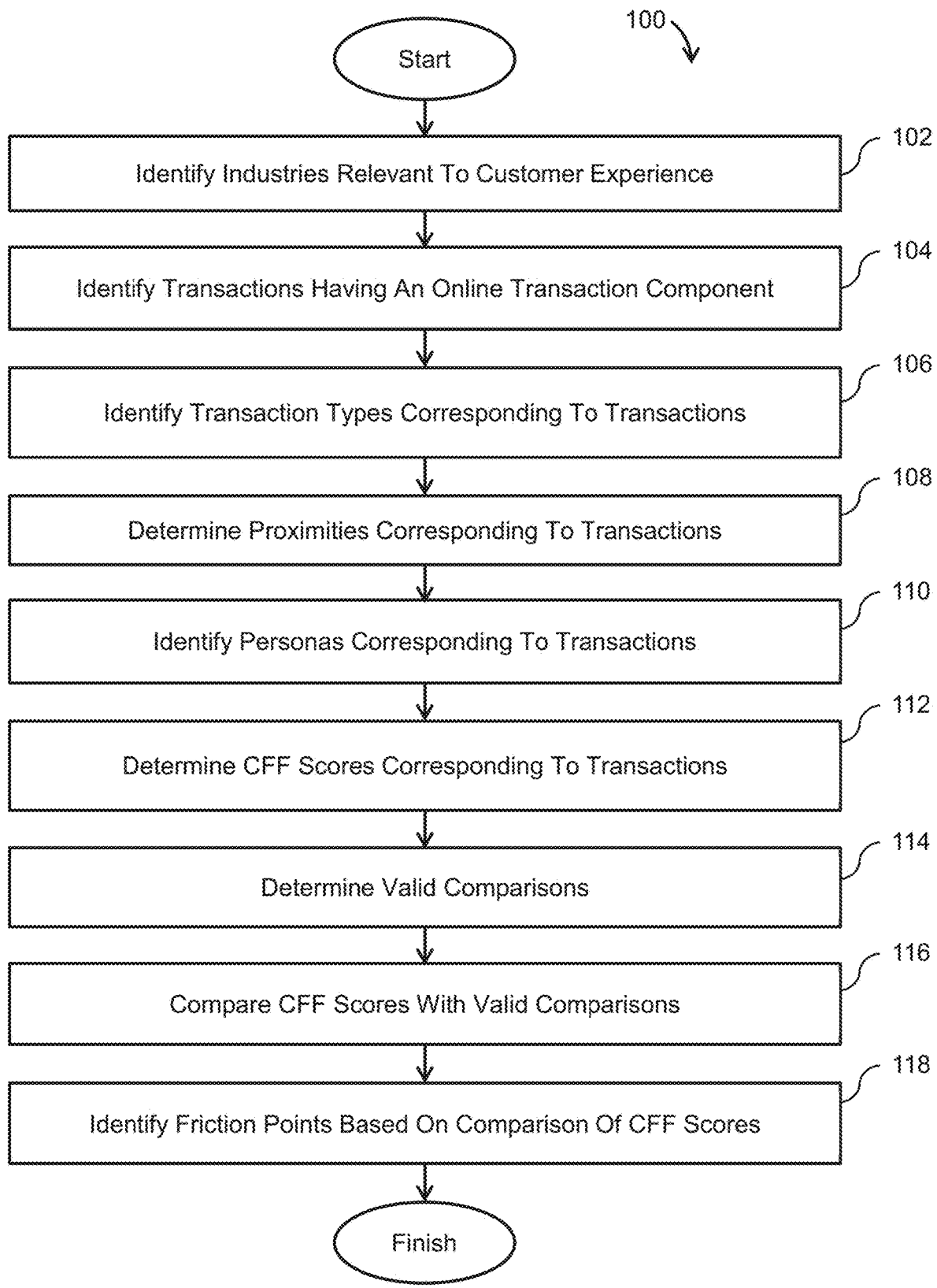
FIG. 1 illustrates a method for providing quantitative evaluations of friction within a customer experience to reduce abandonment and improve conversion of transactions, in accordance with one or more implementations.

FIG. 1 illustrates a method 100 for providing quantitative evaluations of friction within a customer experience to reduce abandonment and improve conversion of transactions, in accordance with one or more implementations. The steps of method 100 presented below are intended to be illustrative. In some implementations, method 100 may be accomplished with one or more additional steps not described, and/or without one or more of the steps discussed, which is not to suggest that other descriptions are limiting. Additionally, the order in which the steps of method 100 are illustrated in FIG. 1 and described below is not intended to be limiting.

In some implementations, business owners may be provided with analysis of one or more real-world aspects of their business. In some implementations, a first aspect of a business may be related factors affecting customers and/or companies' decision to buy goods, services, and/or other offerings. In some implementations, customers and/or companies' decision to buy goods, services, and/or other offerings for a first time may be based on brand perception. In some implementations, customers and/or companies' decision to buy goods, services, and/or other offerings for a second time may be based on brand experience. In some implementations, a second aspect of a business may be related to codified business processes and transactions. In some implementations, codified business processes and transactions may be directly impacting business owners' sales numbers, brand image, profitability and growth. In some implementations, a third aspect of a business may relate to improving how customers' may feel about business processes and transactions.

The process 100 may be executed by a computer system, such as a CRM system, thought embodiments are not limited to computer-implemented techniques, which is not to suggest that any other aspect is limiting. That said, in some computer-implemented embodiments, certain advantages are expected to be afforded by computer-implemented approaches over traditional computerized CRM systems as described below.

At a step 102, one or more industries relevant to the customer experience associated with one or more transactions may be identified. Examples of industries may include one or more of retail, manufacturing, insurance, banking, health care and life sciences (HCLS), public sector, and/or other industries.

At a step 104, one or more transactions may be identified. A given transaction may occur in person, over the phone, entirely online, or it may include an online component and a real-world (offline) component. For example, viewed holistically, a transaction involving a purchase of an item via a website includes an online component in addition to a real-world component (e.g., shipping and receiving the purchased item, interactions with a customer service operator, etc.). Generally speaking, a transaction may include any exchange or interaction between customers and a business entity. Depending on the implementation, the term "customer" may include one or more of customers in the traditional sense (i.e., business-to-customer, B2C), employees (i.e., business-to-employee), or business partners (i.e., business-to-business, B2B). A given transaction may be unique to a specific industry or it may be relevant to different industries.

At a step 106, one or more transaction types corresponding to the one or more transactions may be identified (e.g., determined to apply). For example, when retail is an industry associated with a given transaction, the transaction type may include one or more of layaway, purchase, return, review, credit application, merchandise pickup, clientelling, delivery, credit payment, gift registry, loyalty program, promotions, coupon matching, personal shopper, and/or other transaction types. When manufacturing is an industry associated with a given transaction, the transaction type may include one or more of ordering, billing, accounts payable, accounts receivable, shipping, tracking, campaign management, product feedback, reliability, returns, customer service, engineering support, and/or other transaction types. When insurance is an industry associated with a given transaction, the transaction type may include one or more of quotes, document distribution and binding, claims processing, payment processing, renewals, marketing, competitive quotes, claims payment, adjustment, and/or other transaction types. When banking is an industry associated with a given transaction, the transaction type may include one or more of view transaction history, open account, add account type, bill pay, transfers, money order, order checks, direct deposit, cash withdrawal, stop payment, extract transactions for spending analysis, loan application, and/or other transaction types. When health care and life sciences (HCLS) is an industry associated with a given transaction, the transaction type may include one or more of enrollment, claims processing, claims payment, premium bills, claims and capitation payments, provider network contract negotiation, constituent service, correspondence (e.g., ID cards, letters, requests for information, benefits, explanations, etc.), and/or other transaction types. When public sector is an industry associated with a given transaction, the transaction type may include one or more of permitting, enforcement, fines, traffic court, civil court, utility connection, utility billing, driver's license, license plate, inspections, property tax, alarm registration, alarm permitting, communications, media, and/or other transaction types.

At a step 108, one or more proximities (e.g., channels of interaction between a consumer and a business entity) corresponding to the one or more transactions may be determined. For example, a given proximity may correspond to a given transaction. In some implementations, two or more proximities may be associated with a given transaction. Examples of proximities may include one or more of online, in person, on phone, and/or other proximities. As discussed further herein, customer friction can be assessed across any proximity combination of real-world transactions or transaction components (e.g., in person, on the phone) and, with appropriate technical solutions, online transactions or transaction components.

At a step 110, one or more personas corresponding to the one or more transactions may be identified. For example, a given persona may correspond to a given transaction. In some implementations, two or more personas may be associated with a given transaction. Identifying the one or more personas may include determining whether a given transaction is business-to-customer (B2C), business-to-employee (i.e., employee in role of customer, B2E), or business-to-business (i.e., business partner in role of customer, B2B). Some embodiments classify a transaction by assigning the transaction to one or more of a plurality of groups having shared attributes (e.g., a set of a plurality of attributes having values within respective ranges).

In some implementations, identifying the one or more personas may include determining a generation of a customer. Examples of a generation of a customer may include the greatest generation (b. 1901 to 1926), the silent generation (b. 1927 to 1945), the baby boomer generation (b. 1946 to 1964), Gen X (b. 1965 to 1980), Millennial (Gen Y, b. 1981 to 2000), Boomlets (Gen Z, b. 2001 to present), and/or other descriptions of generations. The customer generation may be relevant due to distinct preferences associated with different generations. FIG. 2 illustrates exemplary generational characteristics or preferences. Some embodiments may cluster groups of transactions or clusters according to a plurality of dimensions, e.g., with a density-based clustering algorithm, like DB-SCAN.

In some implementations, companies, businesses, and/or practices may seek to adapt their business practices with respect to generational scoring and other types of personas. For example, a retailer selling jewelry to early teenagers in malls may identify their customers as pre-teen girls, early teen girls, and grandmothers. As such the customers' persona may be defined as a boomlet and a baby boomer. Based on the determined personas, the retailer may seek to provide a better flow from where a customer finds a product to actually checking out (e.g., buying the product).

In some implementations, customers may relate to ratings and rankings of a company, business, and/or practice due to some emotional attachment with the company, business, and/or practice. For example, the customer may have had an excellent experience with the company, business, and/or practice. In some implementations, companies, businesses, and/or practices may benefit from viewing their companies, businesses, and/or practices from customers' points of view and based on the customers' experiences. In some implementations, customers' interactions may be quantified, e.g., to ensure (or otherwise increase the likelihood that) companies, businesses, and/or practices understand their customers.

In some implementations, one or more objective measurements may be obtained regarding customers' interactions with a company and/or business. The obtained objective measurements may be recorded as CFF scores. In some implementations, responsive to the obtained objective measurements, one or more improvements may be implemented in the company and/or business practices. The one or more improvements may include changing applications, integrating one or more business practices, using good business intelligence, reusing customers' information, dealing with people from a customer service standpoint, and/or other improvements.

Referring again to FIG. 1, at a step 112, one or more CFF scores corresponding to the one or more transactions may be determined. For example, in some implementations, a given CFF score may correspond to a given transaction, a specific component of a given transaction, multiple transactions, or a specific component of multiple transactions. Generally speaking, a CFF score may be a quantification of an aspect of a given transaction that has a negative impact on a customer experience associated with the give transaction. According to some implementation, a lower CFF score may correspond to a higher likelihood of customer satisfaction, reduced abandonment, and improved conversion, whereas a higher CFF score may correspond to a lower likelihood of customer satisfaction, increased abandonment, and reduced conversion. (Or embodiments may invert the score or multiply the score by negative one consistent with the present techniques, reversing these relationships.)

A given CFF score may be determined based on one or more of an industry of the given transaction, a transaction type of the given transaction, a proximity associated with the given transaction, a persona associated with the given transaction, and/or other information or criteria. For example, when CFF scoring is determined based on generation, it may become apparent that channels need to vary based on generation. FIG. 3 illustrates generational scoring, in accordance with one or more implementations. More specifically, FIG. 3 illustrates how mismatched personas and aspects of the customer experience can have negative effects on the overall experience.

In some implementations, a given CFF score may be associated with an individual entity involved a corresponding transaction. This may provide critical insights for that individual entity. In some implementations, a given CFF score may be an aggregate score associated multiple entities. Such an aggregate score may provide an industry- or sector-wide perspective, which may be relevant to future customers.

According to some implementations, a given CFF score may be associated with a corresponding transaction in its entirety. In some implementations, a given CFF score may be associated with one or more aspects of a corresponding transaction. Examples of aspects of a transaction may include one or more of engagement, process, technology, ecosystem, knowledge, and/or other aspects of transactions in which customer friction can occur.

FIG. 4 illustrates various exemplary customer friction factor scoring metrics, in accordance with one or more implementations. In FIG. 4, CFF is evaluated based on transaction aspect as a function of proximity with lowest score being the goal, according to one or more implementations.

In some embodiments, scoring criteria may be arranged in a matrix having columns corresponding to each of a plurality of dimensions (like those illustrated ranging from engagement to knowledge) and rows corresponding to different channels of interaction (e.g., in-person, on-the-phone, or online). Each value of the matrix may include a list of scoring criteria, for instance with each including a scoring rule with, for example, a multiplier and metric, like a multiplier of 50 and a metric of "missed commitments."

Some embodiments may obtain a log of a transactions (e.g., with a sequence of interactions having various ones of the illustrated metrics and their respective values for the transaction, for instance with timestamps and a unique transaction identifier), for instance by interrogating an API of a CRM system, querying a CRM database, or by manual entry. Interactions in a transaction record may be labeled with values indicative of the dimension and channel. Some embodiments may determine CFF scores by, for each transaction, for each interaction, accessing a corresponding value of the given matrix, and selecting one or more rules corresponding to metrics in the interaction. Some embodiments may multiply values of the metrics in the accessed rules by corresponding multipliers in the rules to produce a set of products of the multiplication operations.

In some cases, CFF relationships may be non-linear and higher-order (or other non-linear) terms may be present, e.g., CFF scores may vary with the square of missed commitments, or the log of changes in business policies. These non-linear relationships may similarly be expressed in the rules and applied with similar techniques. In some cases, interactions between the illustrated rules may be expressed in the matrix, e.g., forms of friction may combine synergistically to produce an effect greater than their constituent parts. For instance, the product of the number of missed commitments and business process changes may have an interaction multiplier that independently accounts for this interaction effect in addition to multipliers for the respective metrics in isolation. Some embodiments may account for three-way, four-way, or higher interactions. In some embodiments, interactions may be selected based on a principle component analysis in which interactions are ranked according to their ability to explain failed transactions, and those interactions higher than a threshold rank may be subject to interaction scoring.

Some embodiments may combine the products for a given interaction to produce an interaction CFF score, and some embodiments may combine the interaction CFF scores in a transaction to produce a transaction CFF score. In some embodiments, values are combined by summing the values. In some embodiments, values may be combined with other techniques, e.g., by determining a log-value, or by determining a measure of central tendency, like mean, mode, or median.

Multipliers may be determined with a variety of techniques. In some embodiments, multipliers may be hand-coded based on expert guidance. In some embodiments, multipliers may be determined with statistical techniques, like analysis of variance, where multipliers correspond to an explanatory power of the respect metric in transaction outcomes (like terminated transactions). In some embodiments, multipliers may be determined with machine learning techniques. For instance, some embodiments may obtain a training set of logged transactions with outcomes of the transactions (which include failed transactions). Some embodiments may randomly (e.g., pseudo-randomly) choose initial multipliers for the various rules and then iteratively: 1) determine an aggregate amount of error of predictions of the CFF scores produced by the current multipliers relative to outcomes in the training set (e.g., a root mean square error of instances where the CFF score is below a threshold but a transaction failed); 2) determine partial derivatives of the respective multipliers with respect to the aggregate measure of error (or a measure of fitness); and 3) adjust the multipliers based on directions that the partial derivatives indicate will tend to decrease the aggregate measure of error (or increase fitness). This process may be repeated until a termination condition is detected, e.g., less than a threshold amount of change in the aggregate measure of error or fitness between iterations, or more than a threshold of iterations occur. Some embodiments may repeat this process with different initial multiplier values and choose values that produce a lowest aggregate measure of error (or highest aggregate measure of fitness) among the repetitions to reduce the likelihood of choosing multiplier values associated with a local minimum. Some embodiments may withhold part of the transactions during training and cross validate the model after training to determine whether the aggregate measure of error is less than a threshold when tested against the withheld data.

For instance, as depicted in FIG. 4, for engagements with customers over the phone, a CFF score may increase (1) by one hundred per helping an employee to fill out a form while on the phone, (2) by one per minute while on hold waiting for call to be picked up, (3) by twenty five per being on hold while an employee searches for information, and/or other amount changes for the same or other reasons. A CFF score related to the process aspect of over the phone engagements may increase by ten per incidence of having to leave a message or a voicemail, and/or other amount changes for the same or other reasons. A CFF score related to the technology aspect of over the phone engagements may increase by (1) thirty per incidence of disconnected call while on hold and/or while being transferred, (2) by twenty five for re-entering information within an automated system, and/or other amount changes for the same or other reasons. A CFF score related to the ecosystem aspect of over the phone engagements may increase by (1) ten per each incidence of customer-initiated call, (2) by five per each incidence of business-initiated call, it may decrease by five per friendliness and courtesy shown by employee, and/or it may change by other amounts for other reasons. In some implementations, the CFF score related to the knowledge aspect of over the phone engagements may increase per instance of repeating information that another employee at the business had received before, and/or other amount changes for the same or other reasons.

In some implementations, the CFF score related to in person engagements may be increased (1) by twenty per instance of taking a number, (2) by one per minute wait time before appointment, (3) by ten per minute wait time after appointment time, and/or other amount changes for the same or other reasons. In some implementations, the CFF score related to the process aspect of in person engagements may increase (1) by five per field repeated information on form that business has received before, (2) by fifty for having to return at another time, and/or other amount changes for the same or other reasons. In some implementations, the CFF score related to the technology aspect of in person engagements may increase (1) by twenty five per instance of a printout given to customer, (2) by thirty five for wait time information not displayed or unclear, and/or other amount changes for the same or other reasons. In some implementations, the CFF score related to the ecosystem aspect of in person engagements may decrease by five per visit for being greeted by name, and/or other amount changes for the same or other reasons. In some implementations, the CFF score related to the knowledge aspect of in person engagements may increase (1) by twenty five per page for filling out a paper form, (2) by five per page for filling out an electronic form (e.g., e-form), and/or other amount changes for the same or other reasons. For example, regarding the knowledge aspect of an in person interaction, a patient visiting a dentist every six months may be asked to fill out three or four pages of a paper form including name, address, and previously provided information. In this example, the practice may utilize previously provided information and ask the patient to note changes to the information rather than filling out the form.

In some implementations, a CFF score related to online engagement may increase (1) by one per typed key, (2) by fifty per incorrect product or service received, (3) twenty five per missed commitment (e.g., time, date), and/or other amount changes for the same or other reasons. For online process, a CFF score may decrease by fifty per business changed policy to perform requested service and/or other amount changes for the same or other reasons. For online technology, a CFF score may increase (1) by twenty five per dropped connection or transaction, (2) by five per window refresh or change, (3) by five user interface change in style, (4) by five per window non-intuitive interface, (5) by ten per system with more than one application needed, and/or other amount changes for the same or other reasons. For online ecosystem, a CFF score may increase by two per multiple channel options (e.g., PC, smart phone, human-answered phone number), it may decrease by five for non-applicable live help available on request, and/or it may change by other amounts for other reasons. For online knowledge, a CFF score may increase (1) by twenty five per unclear availability of product or service, (2) by ten for having to retype field information that is erased by routine errors, (3) by five for a field acronym not being explained by mouseover, and/or other amount changes for the same or other reasons.

Returning to FIG. 1, at a step 114, one or more valid comparisons may be determined. A valid comparison of a given FCC score or a given transaction may be one relating to the same industry and the same transaction type. Other considerations described herein may be factors in determining valid comparisons.

At a step 116, the one or more CFF scores may be compared with one or more valid comparisons. FIG. 5 illustrates a comparison between exemplary customer friction factor scores associated with the experience of purchasing eyeglasses, in accordance with one or more implementations. Select factors for determining CFF scores are provided in the respective columns with information from several proximities (i.e., online, in person, and on phone) being organized based on aspect of the transaction.

As shown in FIG. 1, at a step 118, one or more friction points may be identified based on the comparison of the one or more CFF scores. Some embodiments may identify as a friction point an interaction in a transaction that has greater than a threshold interaction CFF score. Some embodiments may detect problematic interaction by aggregating interaction CFF scores across multiple transactions. For instance, some embodiments may determine a measure of central tendency or percentage exceeding a threshold of interaction CFF scores across a population of transactions, and those having a highest measure of central tendency or highest percentage above the threshold may be designated as friction points.

Some embodiments may account for sequential representations in the logged transactions. For instance, some embodiments may form a hidden Markov model from the interactions, where user intent to purchase represents hidden state and the interactions and CFF scores correspond to observed values. Some embodiments may train the hidden Markov model with the Baum-Welch algorithm. In some embodiments, a transition matrix (where values correspond to the probability of transitioning between states based on a sequence of one, two, three, four, or more previous states) between interactions having CFF scores within bins may be determined. Embodiments may prune the matrix to identify those sequences having greater than a threshold probability of transitioning to a terminated transaction as friction points. In other embodiments, other sequential models may be used to similar effect, e.g., a recurrent neural network may be trained to predict the likelihood of subsequent consumer behavior, and those sequences having greater than a threshold probability of producing undesirable consumer behavior may be classified as friction points.

For example, in the comparison of FIG. 5, there appears to be a friction point in one or more aspects for the entity in the right column. For example, company B's engagement with the customers may be negatively affected due to a lack of consistency in experience in various locations. In this example, some products may only be available in some stores and all engagement may be driven by the customer. Company B's process aspect of transactions may be negatively affecting customers' experience by limiting purchases to in stores and having a limited availability of stock in store. A granular analysis of the CFF score may yield the specific friction point(s). Addressing the friction points may reduce abandonment and/or improve conversion. Generally speaking, addressing a given friction point may include an action or change that reduces customer friction associated with that friction point. This quantitatively evaluation of CFF may be performed to (1) understand friction, customer goals, cause of customer friction, and other information related to a transaction; (2) gain insights on the entire customer journey, improvement opportunities, benchmarking, and other information related to a transaction; and/or (3) improve the experience, surpass customer expectations, contain internal costs, deliver pain-free service, and/or make other improvements.

Figure 6:
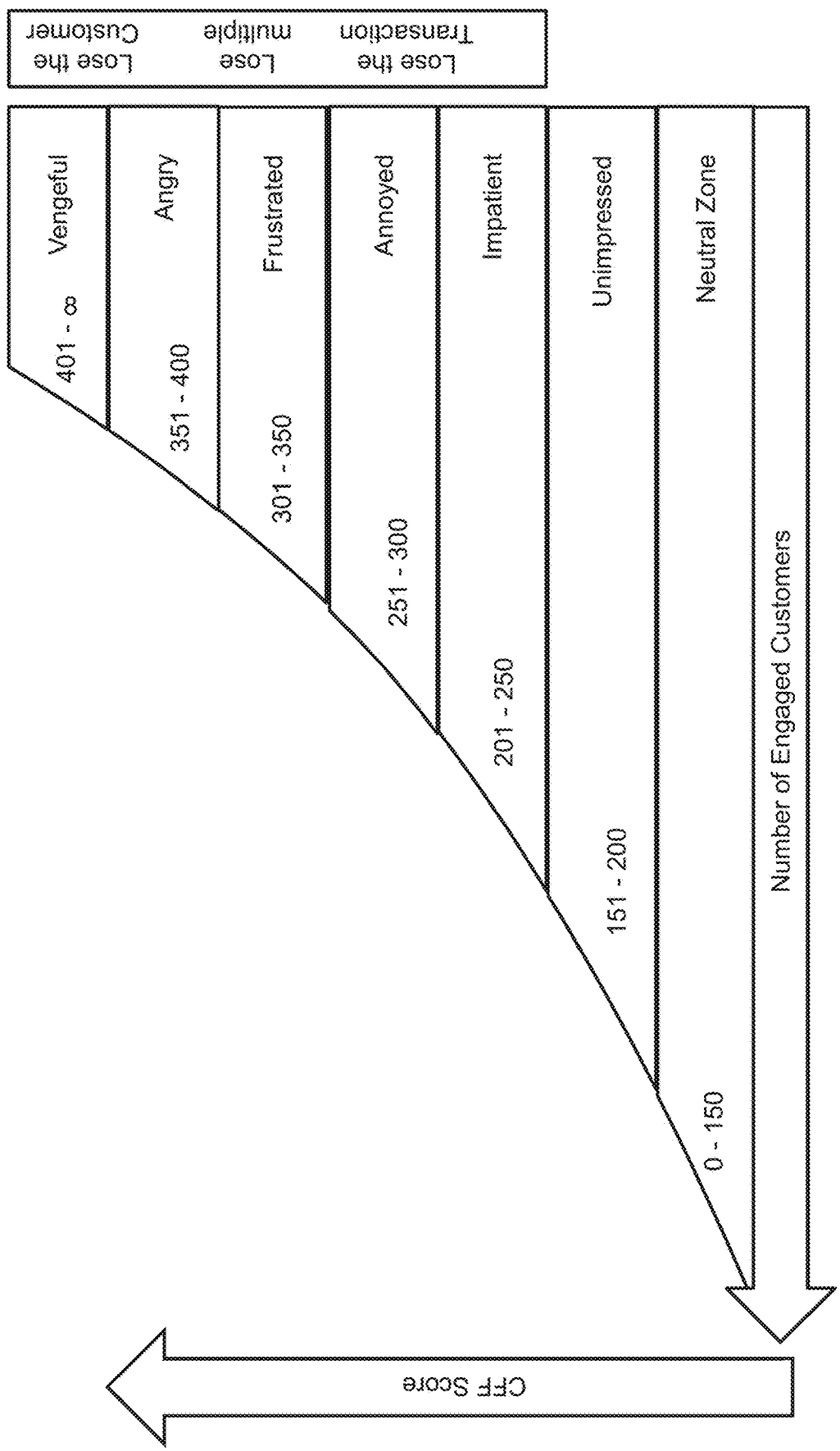
FIG. 6 illustrates an exemplary disengagement spectrum conveying a correlation between customer friction factor score and number of engaged customers, in accordance with one or more implementations.

FIG. 6 illustrates an exemplary disengagement spectrum conveying a correlation between customer friction factor score and number of engaged customers, in accordance with one or more implementations. The disengagement spectrum shows an exemplary relationship between CFF score and number of engaged customers. According to some implementations, a CFF score of 0-150 may be considered neutral zone, a CFF score of 151-200 may indicate unimpressed customers, a CFF score of 201-250 may indicate impatient customers, a CFF score of 251-300 may indicate annoyed customers, a CFF score of 301-350 may indicate frustrated customers, a CFF score of 351-400 may indicate angry customers, and a CFF score of 401 and higher may indicate vengeful customers. Clearly, friction generally does not win customers. Multiple neutral experiences may create loyalty, repeat high friction experiences drives disengagement, loss of transaction, and loss of customer.

In some implementations, the less friction the customers' experiences, the more likely they may be to be satisfied with the product or the service, and continue to do business with the company, business, and/or practice. In some implementations, there may be no theoretical maximum for the CFF number and the business, company, and/or practice may seek to minimize the CFF score related to one or more customer interactions.

For example, as illustrated in FIG. 6, a customer's repeated experience in the neutral zone may represent a social media ally and the brand storyteller. However, the customer being unimpressed with an interaction may denote casual dissatisfaction. At this stage, the customer may be looking for better interactions. In some implementations, the customer's interaction being marked as impatient may increase price pressure. At this stage a customer may compare goods and/or services provided at a competitor with the provided price point. In some implementations, responsive to the customer being short with the business, and/or company service staff, the customer may seek alternatives and may complain to any brand channel. In some implementations, responsive to a customer's experience being denoted as angry, the customer may start to communicate only to the top of the brand (e.g. communicating with the CEO, vice president, and/or other ranking officers). In some implementations, a customer's experience being denoted as vengeful may serve a cheerleader for competitors and may negatively influence revenue.

Figure 7:
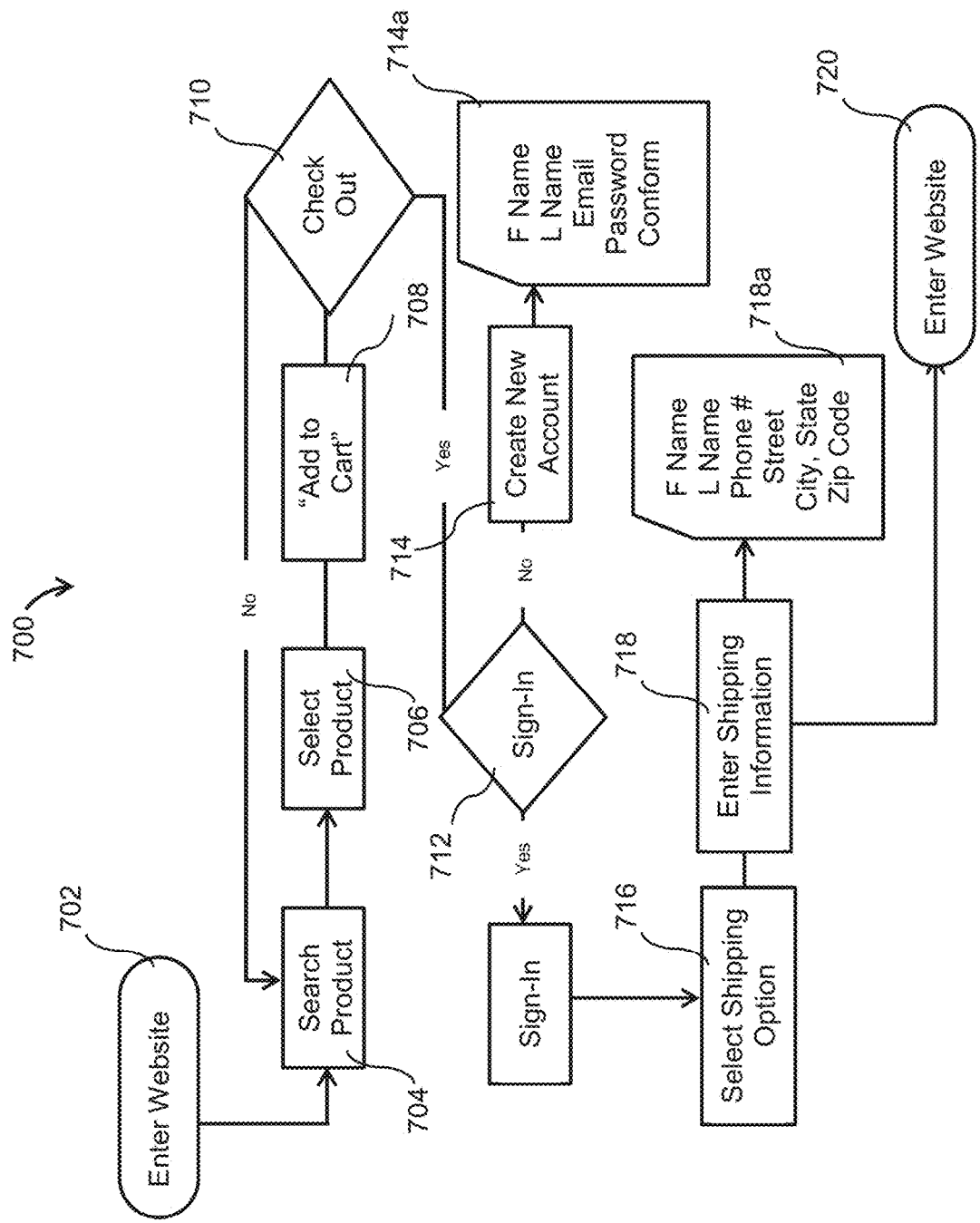
FIG. 7 illustrates an exemplary online purchase process, in accordance with one or more implementations.

FIG. 7 illustrates an exemplary online purchase process 700, in accordance with one or more implementations. The steps of process 700 presented below are intended to be illustrative. In some implementations, process 700 may be accomplished with one or more additional steps not described, and/or without one or more of the steps discussed. Additionally, the order in which the steps of process 700 are illustrated in FIG. 7 and described below is not intended to be limiting.

At a step 702, a customer may enter a website. At a step 704, the customer may search for a product. At a step 706, the customer may select the product. At a step 708, the customer may add the product to the websites shopping cart. At a step 710, the customer may or may not check out. If not, then the process 700 proceeds back to step 704. If the customer does decide to check out, then the process 700 proceeds to a step 712, at which the customer may sign in or not. If not, the process 700 proceeds to a step 714 where the customer creates a new account. Creating a new account may include entering information shown in box 714a. If the customer does sign in at step 712, the process 700 proceeds to a step 716 where the customer selects the shipping option. At a step 718, the customer enters shipping information. The shipping information may include the information shown in box 718a. At a step 720, the customer may exit the website.

Figure 8:
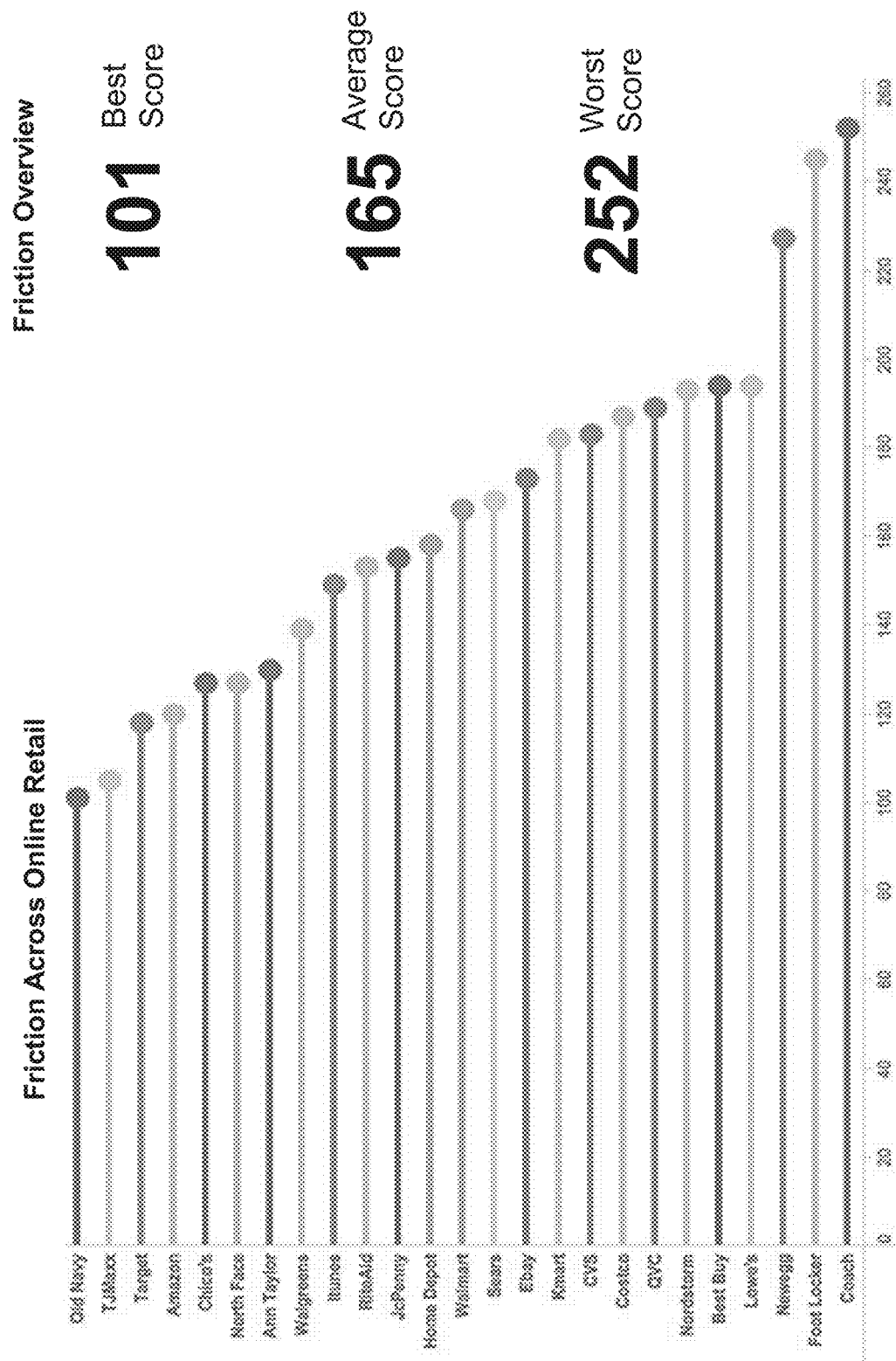
FIG. 8 illustrates exemplary customer friction factor scores across the top twenty five online retailers for transactions involving a new Millennial customer making an online purchase, in accordance with one or more implementations.

FIG. 8 illustrates exemplary customer friction factor scores across the top twenty five online retailers for transactions involving a new Millennial customer making an online purchase, in accordance with one or more implementations.

Exemplary implementations may facilitate a path to customer centric digital transformation by understanding and quantifying customer friction and establishing focused requirements. Some implementations may begin with an exploratory stage: defining personas, establishing goals, and identifying transactions and processes. Another stage may focus on experience: accomplishing goals, determining CFF scores for transactions, and identifying friction points. An identify stage may facilitate understanding root causes, defining recommendations, and establishing a roadmap. In a transform stage, an entity may implement solutions, evaluate customer friction, and repeat one or more stages.

In some implementations, the business and/or company owner, stakeholder, and/or other representatives may participate in a consulting engagement. The consulting engagement may have a duration of approximately three to six weeks, and/or other durations. In some implementations, the business and/or company owner, stakeholder, and/or other representatives may identify one or more transactions, personas, aspects to be scored, and/or other information. In some implementations, responsive to the identification of one or more transactions, personas, aspects to be scored, and/or other information, one or more of a blind friction assessment, a credentialed study, and/or other assessments may be effectuated.

In some implementations, the blind friction assessment may include interacting with one or more business and/or company transactions and/or processes to determine one or more customer friction factors without being a customer and/or a paying customer. For example, a user may register on an online shopping website and obtain information regarding transactions and aspects to be scored inexpensively.

In some implementations, a credentialed study may include working in a test environment such that production processes are minimally impacted. For example, a study for a property and casualty insurance claim may be performed in a test environment to prevent an occurrence of fraud, minimize an impact on the service process, and avoid wasting man-hours. In some implementations, blind friction assessment may be utilized to benchmark a business, practice, and/or company against the rest of the industry. In some implementations, credentialed study may be utilized to score and/or benchmark a business, practice, and/or company against its own practices.

Figure 9:
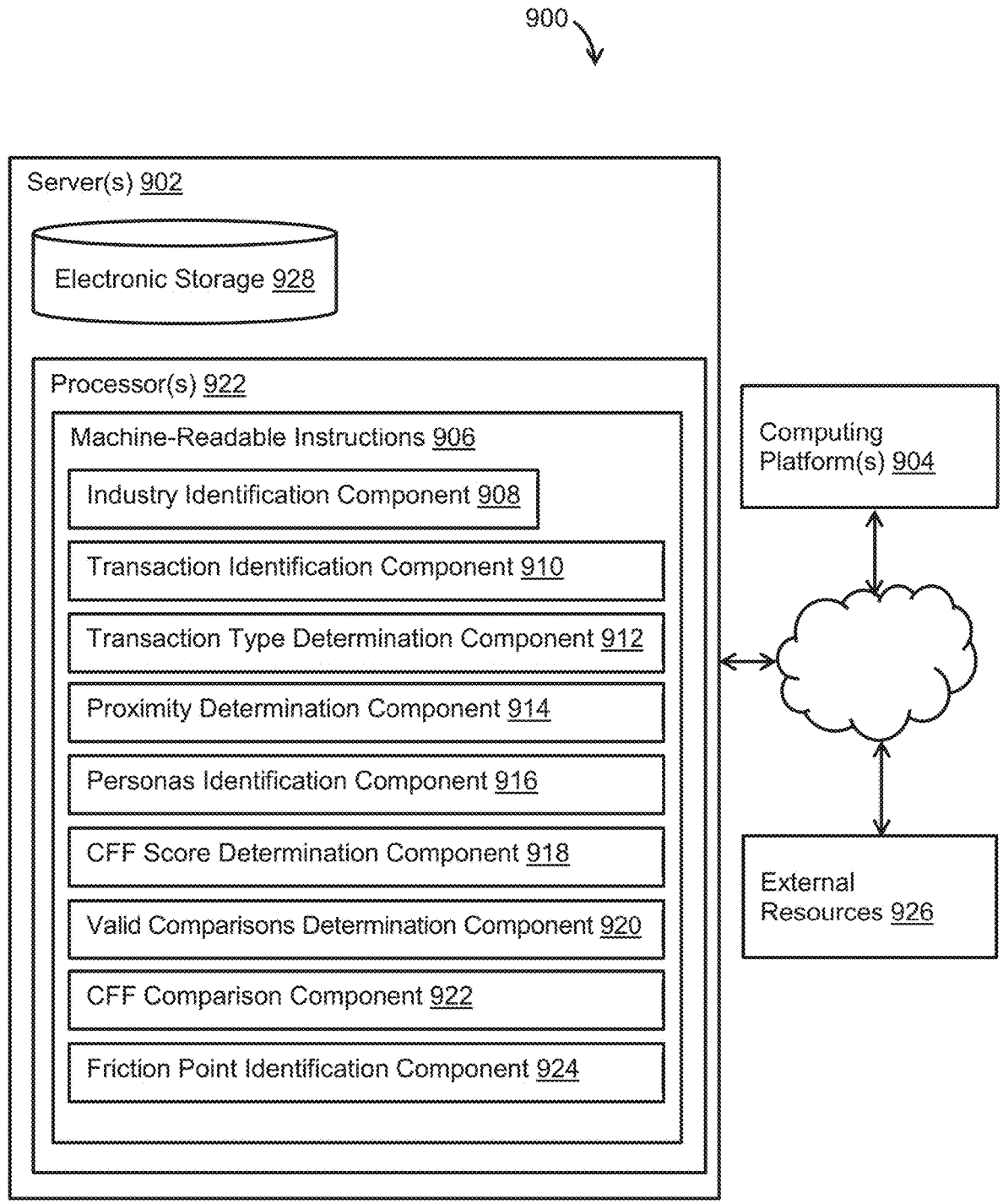
FIG. 9 illustrates a system configured for providing quantitative evaluations of friction within a customer experience to reduce abandonment and improve conversion of transactions, in accordance with one or more implementations.

FIG. 9 illustrates a system 900 configured for providing quantitative evaluations of friction within a customer experience to reduce abandonment and improve conversion of transactions, in accordance with one or more implementations. In some implementations, system 900 may include one or more servers 902. The server(s) 902 may be configured to communicate with one or more computing platforms 904 according to a client/server architecture, a peer-to-peer architecture, and/or other architectures. The users may access system 900 via computing platform(s) 904.

The server(s) 902 may be configured to execute machine-readable instructions 906. The machine-readable instructions 906 may include one or more of an industry identification component 908, a transaction identification component 910, a transaction type determination component 912, a proximity determination component 914, a personas identification component 916, a customer friction factor (CFF) score determination component 918, a valid comparisons determination component 920, a CFF comparison component 922, a friction point identification component 924, and/or other machine-readable instruction components.

In some implementations, server(s) 902, computing platform(s) 904, and/or external resources 926 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 902, computing platform(s) 904, and/or external resources 926 may be operatively linked via some other communication media.

A given computing platform 904 may include one or more processors configured to execute machine-readable instructions. The machine-readable instructions may be configured to enable an expert or user associated with the given computing platform 904 to interface with system 900 and/or external resources 926, and/or provide other functionality attributed herein to computing platform(s) 904. By way of non-limiting example, the given computing platform 904 may include one or more of a desktop computer, a laptop computer, a handheld computer, a tablet computing platform, a NetBook, a Smartphone, a gaming console, and/or other computing platforms.

External resources 926 may include sources of information, hosts and/or providers of customer relationship management systems outside of system 900, external entities participating with system 900, and/or other resources. In some implementations, some or all of the functionality attributed herein to external resources 926 may be provided by resources included in system 900.

Server(s) 902 may include electronic storage 928, one or more processors 930, and/or other components. Server(s) 902 may include communication lines, or ports to enable the exchange of information with a network and/or other computing platforms. Illustration of server(s) 902 in FIG. 9 is not intended to be limiting. Server(s) 902 may include a plurality of hardware, software, and/or firmware components operating together to provide the functionality attributed herein to server(s) 902. For example, server(s) 902 may be implemented by a cloud of computing platforms operating together as server(s) 902.

Electronic storage 928 may comprise non-transitory storage media that electronically stores information. The electronic storage media of electronic storage 928 may include one or both of system storage that is provided integrally (i.e., substantially non-removable) with server(s) 902 and/or removable storage that is removably connectable to server(s) 902 via, for example, a port (e.g., a USB port, a firewire port, etc.) or a drive (e.g., a disk drive, etc.). Electronic storage 928 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 928 may include one or more virtual storage resources (e.g., cloud storage, a virtual private network, and/or other virtual storage resources). Electronic storage 928 may store software algorithms, information determined by processor(s) 930, information received from server(s) 902, information received from computing platform(s) 904, and/or other information that enables server(s) 902 to function as described herein.

Processor(s) 930 may be configured to provide information processing capabilities in server(s) 902. As such, processor(s) 930 may include one or more of a digital processor, an analog processor, a digital circuit designed to process information, an analog circuit designed to process information, a state machine, and/or other mechanisms for electronically processing information. Although processor(s) 930 is shown in FIG. 9 as a single entity, this is for illustrative purposes only. In some implementations, processor(s) 930 may include a plurality of processing units. These processing units may be physically located within the same device, or processor(s) 930 may represent processing functionality of a plurality of devices operating in coordination. The processor(s) 930 may be configured to execute machine-readable instruction components 908, 910, 912, 914, 916, 918, 920, 922, 924, and/or other machine-readable instruction components. Processor(s) 930 may be configured to execute machine-readable instruction components 908, 910, 912, 914, 916, 918, 920, 922, 924, and/or other machine-readable instruction components by software; hardware; firmware; some combination of software, hardware, and/or firmware; and/or other mechanisms for configuring processing capabilities on processor(s) 930. As used herein, the term "machine-readable instruction component" may refer to any component or set of components that perform the functionality attributed to the machine-readable instruction component. This may include one or more physical processors during execution of processor readable instructions, the processor readable instructions, circuitry, hardware, storage media, or any other components.

It should be appreciated that although machine-readable instruction components 908, 910, 912, 914, 916, 918, 920, 922, and 924 are illustrated in FIG. 9 as being implemented within a single processing unit, in implementations in which processor(s) 930 includes multiple processing units, one or more of machine-readable instruction components 908, 910, 912, 914, 916, 918, 920, 922, and/or 924 may be implemented remotely from the other machine-readable instruction components. The description of the functionality provided by the different machine-readable instruction components 908, 910, 912, 914, 916, 918, 920, 922, and/or 924 described below is for illustrative purposes, and is not intended to be limiting, as any of machine-readable instruction components 908, 910, 912, 914, 916, 918, 920, 922, and/or 924 may provide more or less functionality than is described. For example, one or more of machine-readable instruction components 908, 910, 912, 914, 916, 918, 920, 922, and/or 924 may be eliminated, and some or all of its functionality may be provided by other ones of machine-readable instruction components 908, 910, 912, 914, 916, 918, 920, 922, and/or 924. As another example, processor(s) 930 may be configured to execute one or more additional machine-readable instruction components that may perform some or all of the functionality attributed below to one of machine-readable instruction components 908, 910, 912, 914, 916, 918, 920, 922, and/or 924.

The industry identification component 908 may be configured to identify one or more industries relevant to the customer experience associated with one or more transactions. The one or more industries may include a first industry.

The transaction identification component 910 may be configured to identify one or more transactions. The one or more transactions may include a first transaction.

The transaction type determination component 912 may be configured to identify one or more transaction types corresponding to the one or more transactions. A first transaction type may correspond to the first transaction.

The proximity determination component 914 may be configured to determine one or more proximities corresponding to the one or more transactions. The one or more proximities may include a first proximity corresponding to the first transaction.

The personas identification component 916 may be configured to identify one or more personas corresponding to the one or more transactions. The one or more personas may include a first persona corresponding to the first transaction.

The CFF score determination component 918 may be configured to determine one or more CFF scores corresponding to the one or more transactions. The one or more CFF scores may include a first CFF score corresponding to the first transaction. The first CFF score may be a quantification of an aspect of the first transaction that has a negative impact on a customer experience associated with the first transaction.

The valid comparisons determination component 920 may be configured to determine one or more valid comparisons. The one or more valid comparisons may include a first comparison.

The CFF comparison component 922 may be configured to compare the one or more CFF scores with one or more valid comparisons. The first CFF score may be compared to the first comparison.

Friction point identification component 924 may be configured to identify one or more friction points based on the comparison of the one or more CFF scores. The one or more friction points may include a first friction point. The first friction point may be associated with the first transaction. Addressing the first friction point may reduce abandonment and may improve conversion associated with transactions.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A tangible, non-transitory, computer-readable medium storing instructions that, when executed, effectuate operations comprising:

identifying, with a computer system, one or more transactions, the one or more transactions including a first transaction;

identifying, with the computer system, one or more personas corresponding to the one or more transactions, the one or more personas including a first persona corresponding to the first transaction;

determining, with the computer system, one or more customer friction factor (CFF) scores corresponding to the one or more transactions, the one or more CFF scores including a first CFF score corresponding to the first transaction, the first CFF score being a quantification of an aspect of the first transaction that has a negative impact on a customer experience associated with the first transaction; and identifying one or more frictions points based on the one or more CFF scores, the one or more friction points including a first friction point, wherein the first friction point is associated with the first transaction, and wherein addressing the first friction point reduces abandonment and improves conversion associated with transactions.

2. The medium of claim 1, the operations further comprising identifying one or more industries relevant to the customer experience including a first industry.

3. The medium of claim 1, the operations further comprising identifying one or more transaction types corresponding to the one or more transactions, a first transaction type corresponding to the first transaction.

4. The medium of claim 3, wherein retail is an industry associated with the first transaction and wherein the first transaction type relates to one or more of layaway, purchase, return, review, credit application, merchandise pickup, clientelling, delivery, credit payment, gift registry, loyalty program, promotions, coupon matching, or personal shopper.

5. The medium of claim 3, wherein manufacturing is an industry associated with the first transaction and wherein the first transaction type relates to one or more of ordering, billing, accounts payable, accounts receivable, shipping, tracking, campaign management, product feedback, reliability, returns, customer service, or engineering support.

6. The medium of claim 3, wherein banking is an industry associated with the first transaction and wherein the first transaction type relates to one or more of view transaction history, open account, add account type, bill pay, transfers, money order, order checks, direct deposit, cash withdrawal, stop payment, extract transactions for spending analysis, or loan application.

7. The medium of claim 3, wherein public sector is an industry associated with the first transaction and wherein the first transaction type relates to one or more of permitting, enforcement, fines, traffic court, civil court, utility connection, utility billing, driver's license, license plate, inspections, property tax, alarm registration, alarm permitting, communications, or media.

8. The medium of claim 1, the operations further comprising determining one or more proximities corresponding to the one or more transactions, the one or more proximities including a first proximity corresponding to the first transaction.

9. The medium of claim 8, wherein the first proximity includes one or more of online, in person, or on phone transactions.

10. The medium of claim 1, wherein a lower CFF score corresponds to a higher likelihood of customer satisfaction, reduced abandonment, and improved conversion of transactions.

11. The medium of claim 1, wherein a higher CFF score corresponds to a lower likelihood of customer satisfaction, increased abandonment, and reduced conversion of transactions.

12. The medium of claim 1, wherein determining the first CFF score is based on one or more of an industry of the first transaction, a transaction type of the first transaction, a proximity associated with the first transaction, or a persona associated with the first transaction.

13. The medium of claim 1, wherein the first CFF score is associated with the first transaction in its entirety.

14. The medium of claim 1, wherein the first CFF score is associated with one or more aspects of the first transaction including a first aspect.

15. The medium of claim 14, wherein the first aspect is categorized as one or more of engagement, process, technology, ecosystem, or knowledge.

16. The medium of claim 1, wherein the first CFF score is associated with an individual entity involved in the first transaction.

17. The medium of claim 1, wherein the first CFF score is an aggregate score associated with multiple entities.

18. The medium of claim 1, the operations further comprising determining one or more valid comparisons including a first comparison, the first comparison being a CFF score other than the first CFF score, the first comparison relating to the same industry as the first transaction and the same transaction type of the first transaction.

19. The medium of claim 1, wherein identifying the one or more personas includes determining a generation of a customer.

20. The medium of claim 19, wherein the generation of the customer is selected from the group consisting of greatest generation, silent generation, baby boomer, Gen X, Millennial, or Boomlets.

21. The medium of claim 1, wherein the computer system is a customer relations management (CRM) system.

22. The medium of claim 1, wherein the operations comprise:
steps for providing quantitative evaluations of friction within customer experiences.

23. The medium of claim 1, wherein the operations comprise:
steps for determining the CFF score.

24. The medium of claim 1, wherein determining one or more CFF scores comprises steps for evaluating CFF scores based on transaction aspect as a function of proximity.

25. The medium of claim 1, wherein the one or more CFF scores are determined based on one or more multipliers, and where the one or more multipliers are determined with steps for determining multipliers.

26. The medium of claim 1, wherein the operations comprise:
steps for accounting for sequential representations in logged transaction including at least some of the one or more transactions.

27. The medium of claim 1, wherein the computer system comprises means for providing quantitative evaluations of friction within customer experiences.

28. A method, comprising:
identifying, with a computer system, one or more transactions, the one or more transactions including a first transaction;

identifying, with the computer system, one or more personas corresponding to the one or more transactions, the one or more personas including a first persona corresponding to the first transaction;

determining, with the computer system, one or more customer friction factor (CFF) scores corresponding to the one or more transactions, the one or more CFF scores including a first CFF score corresponding to the first transaction, the first CFF score being a quantification of an aspect of the first transaction that has a negative impact on a customer experience associated with the first transaction; and identifying one or more friction points based on the one or more CFF scores, the one or more friction points including a first friction point, wherein the first friction point is associated with the first transaction, and wherein addressing the first friction point reduces abandonment and improves conversion associated with transactions.

\* \* \* \* \*